(12) United States Patent
Landt

(10) Patent No.: US 6,677,852 B1
(45) Date of Patent: Jan. 13, 2004

(54) SYSTEM AND METHOD FOR AUTOMATICALLY CONTROLLING OR CONFIGURING A DEVICE, SUCH AS AN RFID READER

(75) Inventor: Jeremy A. Landt, Santa Fe, NM (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/401,066

(22) Filed: Sep. 22, 1999

(51) Int. Cl.[7] ................................................ H04Q 5/22
(52) U.S. Cl. .............. 340/10.1; 340/10.51; 340/825.22; 340/572.1; 235/375; 235/380
(58) Field of Search ............... 340/10.1, 10.3, 340/10.4, 10.41, 10.42, 10.51, 10.52, 825.69, 825.72, 286.01, 825.22, 572.1, 572.3; 235/375, 380, 462.01, 462.44, 472.01

(56) References Cited

U.S. PATENT DOCUMENTS

| | | | | |
|---|---|---|---|---|
| 4,739,328 A | * | 4/1988 | Koelle et al. ................ | 342/44 |
| 5,030,807 A | * | 7/1991 | Landt et al. ................ | 235/375 |
| 5,382,784 A | | 1/1995 | Eberhardt | |
| 6,246,326 B1 | * | 6/2001 | Wiklof et al. ............ | 340/572.1 |
| 6,318,636 B1 | * | 11/2001 | Reynolds et al. ...... | 235/472.01 |
| 6,415,978 B1 | * | 7/2002 | McAllister ............. | 235/462.01 |
| 6,523,752 B2 | * | 2/2003 | Nishitani et al. .......... | 124/23.1 |
| 6,545,605 B2 | * | 4/2003 | Van Horn et al. ....... | 340/572.1 |

FOREIGN PATENT DOCUMENTS

| | | |
|---|---|---|
| FR | 2 760 209 | 9/1998 |
| JP | 10040329 A | 2/1998 |

* cited by examiner

Primary Examiner—Nina Tong
(74) Attorney, Agent, or Firm—Seed IP Law Group PLLC (57) ABSTRACT

The system and method for automatically controlling or configuring, a device, such as an RFID Reader, reads a master control tag to upload sets of instructions from the tag to memory resident in the reader. Thereafter, the reader may read a control tag to select one or more sets of instructions stored in memory. The reader may thus be readily programmed without the need for physically connecting the reader to a computer, and without employing expensive key pads and display screens.

46 Claims, 5 Drawing Sheets

SYSTEM AND METHOD FOR AUTOMATICALLY CONTROLLING OR CONFIGURING A DEVICE, SUCH AS AN RFID READER

TECHNICAL FIELD

This invention relates to dedicated devices, such as automated data collection readers, having a processor that executes a set of instructions, and more particularly to storing instructions for the processor.

BACKGROUND OF THE INVENTION

A variety of methods exist for tracking and providing information about items. For example, inventory items typically carry printed labels providing information such as serial numbers, price, weight, and size. Some labels include data carriers in the form of machine-readable symbols that can be selected from a variety of machine-readable symbologies, such as bar code or area code symbologies. The amount of information that the symbols can contain is limited by the space constraints of the label. Updating the information in these machine-readable symbols typically requires the printing of a new label to replace the old.

Data carriers such as memory devices provide an alternative method for tracking and providing information about items. Memory devices permit the linking of large amounts of data with an object or item. Memory devices typically include a memory and logic in the form of an integrated circuit ("IC") and means for transmitting data to and/or from the device. For example, an RFID tag typically includes a memory for storing data, an antenna, an RF transmitter, and/or an RF receiver to transmit data, and logic for controlling the various components of the memory device. The basic structure and operation of RFID tags can be found in, for example, U.S. Pat. No. 4,739,328 to Koelle et al. and U.S. Pat. No. 5,030,807 to Landt et al. RFID tags are generally formed on a substrate and can include, for example, analog RF circuits and digital logic and memory circuits. The RFID tags can also include a number of discrete components, such as capacitors, transistors, and diodes. The RF transmission of data can be accomplished with modulated back scatter as well as modulation of an active RF transmitter.

RFID tags can be either passive or active devices. Active devices are self-powered, by a battery for example. Passive devices do not contain a discrete power source, but derive their energy from an RF signal used to interrogate the RFID tag. Passive RFID tags usually include an analog circuit that detects and decodes the interrogating RF signal and that provides power from the RF field to a digital circuit in the tag. The digital circuit generally executes all of the data functions of the RFID tag, such as retrieving stored data from memory and causing the analog circuit to modulate to the RF signal to transmit the retrieved data. In addition to retrieving and transmitting data previously stored in the memory, the RFID tag can permit new or additional information to be stored in the RFID tag's memory, or can permit the RFID tag to manipulate data or perform some additional functions.

Another form of memory device is an optical tag. Optical tags are similar in many respects to RFID tags, but rely on an optical signal to transmit data to and/or from the tag. Additionally, touch memory devices are available as data carriers, for example touch memory devices from Dallas Semiconductor of Dallas, Tex. Touch memory devices are also similar to RF tags, but require physical contact with a probe to store and retrieve data.

Reader devices for these memory devices employ a processor executing instructions contained in embedded code or in read only memory ("ROM"), and random access memory ("RAM") for storage of temporary data. Traditionally, these reader devices store much of their instruction sets in a fixed form in a non-volatile memory, such as read-only memory ("ROM"). More recently, reader devices have taken advantage of reprogrammable non-volatile memories, such as erasable programmable memory ("EPROM"), electronically erasable PROM ("EEPROM"), and flash RAM to store instruction sets. Programmable memories allow the dedicated device to be reprogrammed without the expense and inconvenience of replacing a ROM or motherboard.

Such approaches have a number of distinct drawbacks, For instance, storing the executable code for anything but the most simple reader device requires a significant amount of non-volatile memory, which can be expensive. The reader device may not be upgradable or may be difficult to upgrade, requiring the entire instruction set to be reprogrammed. Such an upgrade may take a considerable period of time, and may require an expensive service call or return to the manufacturer. Reprogramming the reader device may lead to corrupted executable code, which can render the device permanently inoperative. This is particularly a problem when the size of the program is considerable.

Additionally, the user of a reader device my not be aware of a significant upgrade and may be running old, incompatible or corrupted instruction sets. Furthermore, if the reader device is to be field programmable, then the device will require expensive ports for accepting new instruction sets, such as a PCMCIA card port. Alternatively or additionally, to permit the reader device to be field programmable or configurable to perform a variety of tasks, the device must include numerous switches and a display to permit such field programmability and user feedback to properly and partially or completely reprogram the device in the field, and not require it to be sent back to the manufacturer. Furthermore, by permitting manual reprogramming or reconfiguration of a reader makes the reader susceptible to human error during such manual reprogramming/reconfiguring.

SUMMARY OF THE INVENTION

The present invention overcomes the limitations of the prior art and provides additional benefits. Under one aspect of the invention, a RFID tag or other data collection or memory device stores data to control the operation and configuration of a RFID reader or other reading/interrogating device. Aspects of the invention provide a simple, inexpensive and fool-proof reader with controllable functions, where such reader is programmable using a simple interface, and which prevents undesired operation due to intentional or unintentional input or control by a user. One aspect of the invention provides desired capability for the reader without using expensive keyboards or display screens, and permits management to simply, inexpensively and in a tamperproof manner program a reader to perform desired actions or functionality. Possible human error due to manual reprogramming is avoided and inexpensive readers may be produced under aspects of the invention.

In a broad sense, the invention includes an apparatus having a data carrier receiver unit, a memory and a processor. The data carrier receiver unit receives data stored in data carriers such as RFID tags. The memory stores basic instructions for operating the apparatus and has an instruction memory section with several instruction sets stored therein. The processor is coupled to the memory and the data carrier receiver unit. The processor is programmed to read data from a control data carrier and select at least one of the instruction sets in the instruction memory section based on the read data. Thereafter, the processor performs the selected instructions from the instruction set.

The invention also includes apparatus and methods for programming RFID tags, including writing commands to a command RFID tag. The invention includes a download-type apparatus having a communication terminal, a memory and a processor, where the communication terminal is configured to establish a communication channel with an RFID reader. The processor is programmed to write at least one instruction set to an RFID reader, where the RFID reader thereafter reads a command data character to select and execute at least one instruction set.

Additionally, the invention includes a data carrier tag, such as an RFID tag, which includes a memory having a command in a specified field that commands an RFID reader, reading the specified field, to select one of several instruction sets stored in the reader. Indeed, the invention includes any automatically-readable medium to be automatically read by a microprocessor controlled device where the medium stores a data structure. The data structure includes a type field, an instruction set indicator field, and for each indicator field, an instruction set. Each instruction set provides several instructions for controlling operations of an RFID reader device.

Moreover, aspects of the invention include a method of controlling an RFID reader using a control RFID tag, and an automatically-readable medium storing such a method. Furthermore, the invention includes a method of reading RFID tags using a reader. The method includes first reading an instruction set identifier in a control tag. Then, one of several instruction sets stored in the RFID reader are selected based on the instruction set identifier. Thereafter, several RFID tags are read and the selected instruction set is executed until another instruction set identifier in another control tag is read. Further details on all aspects of the invention are found in the claims below.

In the drawings, identical reference numbers identify identical or substantially similar elements or steps. For ease in identifying the discussion of any particular element, the most significant digit or digits in a reference number refer to the figure number in which the element is first introduced (e.g., element 204 is first introduced and discussed with respect to FIG. 2).

DETAILED DESCRIPTION OF EMBODIMENTS OF THE INVENTION

In the following description, certain specific details are set forth in order to provide a thorough understanding of, and enabling description for, various embodiments of the invention. However, one skilled in the art will understand that the invention may be practiced without these details. In other instances, well known structures associated with processors, computing systems, tags, and readers have not been shown or described in detail to avoid unnecessarily obscuring the description of the embodiments of the invention.

Figure 1:
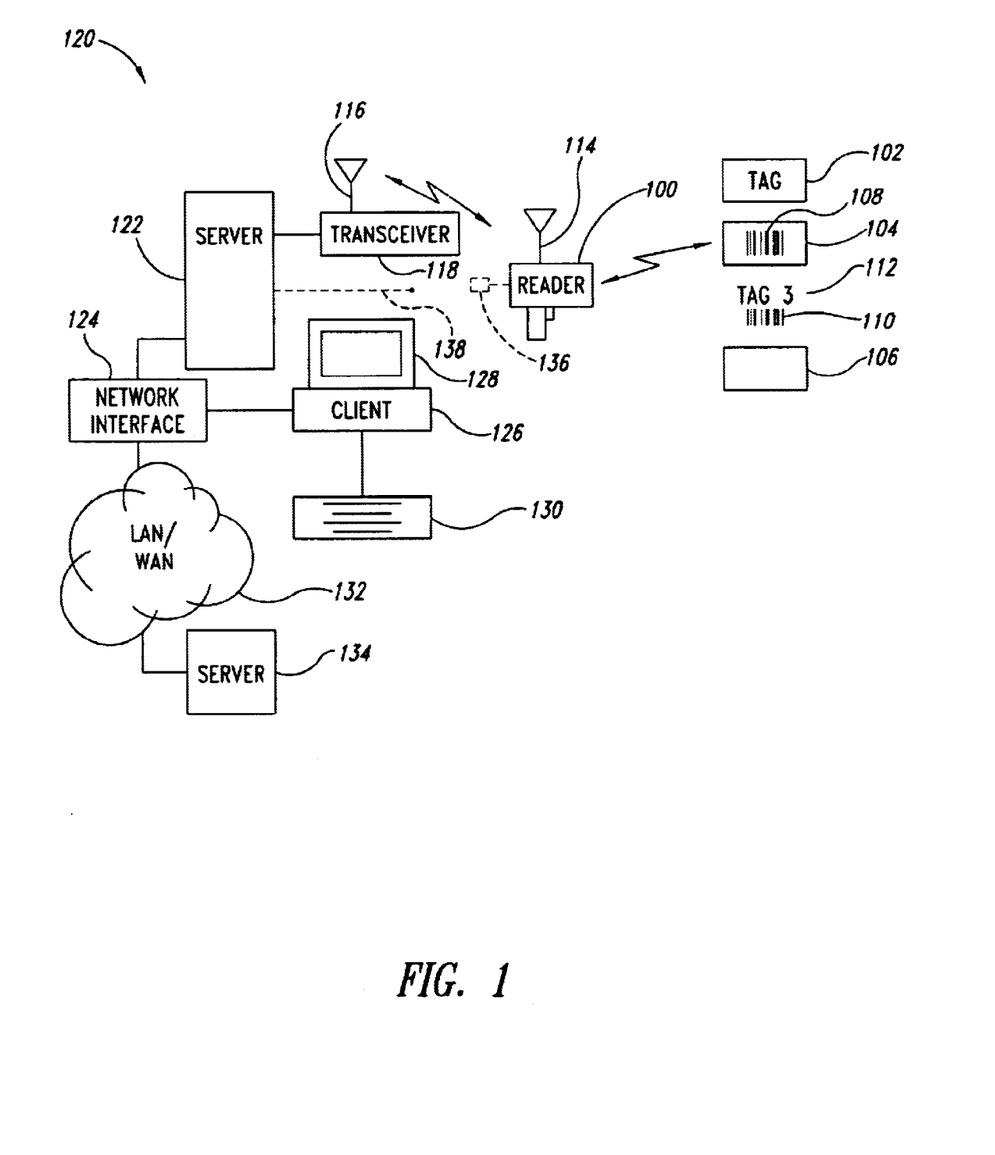
FIG. 1 is a block diagram of several RFID tags, an RFID tag reader and a computer network for receiving data from the RFID reader.

Referring to FIG. 1, an example of a data collection environment includes a reader 100, such as an RFID reader, and several RFID tags 102, 104 and 106. The tag 104 is a "smart label" in that it includes a bar code symbol 108 or other machine-readable symbol formed on an upper or outer surface of the tag. The tag 106 similarly includes a bar code symbol 110 not formed on the tag, but affixed or printed near the tag. The tag 106 also includes human-readable indicia 112 that help a user determine information about the tag 106. Importantly, the tag 104 is a master control tag, while the tag 106 is a control tag, as described below. While RFID tags are shown and described with respect to FIG. 1, other known memory devices may be employed, such as optical tags or touch memory devices.

Machine-readable symbols RFID tags, touch memory devices, and optical tags are generally known in the relevant arts and will therefore not be discussed in detail. A common aspect of the tags 102, 104 and 106, and other "data carriers," is the ability to store data for later retrieval by a retrieval device, such as the reader 100. Some data carriers, such as the machine-readable symbols 108 and 110, only permit data to be written or stored once. Other data carriers, such as the tags 102, 104 and 106, can be reprogrammable, allowing repeated updating of the information therein.

The reader 100 includes an antenna 114 that permits the reader to communicate, through an antenna 116 and transceiver 118, with a computer system 120. The computer system 120 is shown as forming part of a local area network ("LAN") or wide area network ("WAN"). The computer system 120 includes a server computer 122 connected to a network interface 124. The network interface 124 in turn connects a client computer 126 and the server 122 to a LAN or WAN 132.

The client computer 126 can be a personal computer having a processor, hard disk drive, optical disk drive and/or magnetic disk drive for reading from, and writing to, removable disks. Other removable media for storing computer-executable, or processor-executable, instructions include magnetic cassettes, flash memory cards, digital video disks ("DVD"), Bernoulli cartridges, removable semiconductor chips such as RAM or ROM, smart cards, PCMCIA cards, and the like.

A user can enter commands and information into the client computer 126 through input devices such as a keyboard 130, or other input devices such as a mouse, microphone, joy stick, game pad, scanner, etc. A monitor 128 or other display device coupled to the client computer 126 provides visual output to the user. Other output devices may include speakers, printers, etc.

The computer system 120 of FIG. 1 permits the server and client computers 122 and 126 to communicate with a remote computer such as a remote server computer 134. If the WAN 132 is the Internet, then the server and/or client computers 122, 126 include a web browser or other interface for facilitating Internet communication with the remote server computer 134.

While the reader 100 can communicate with the computer system 120 via a wireless link (via antennas 114 and 116), other communication connections are possible. For example, the reader 100 may include a socket 136 to permit the reader to connect with a plug 138 of the computer system 120 and provide a wired connection therebetween.

The plug 138 can form part of a docking station to permit data exchange as well as battery recharging for the reader 100. Other known methods for communicating between the reader 100 and the computer system 120 may be employed, as will be appreciated by those skilled in the relevant art. While the reader 100 is generally described herein as being a hand-held reader, aspects of the invention may be equally applicable to a fixed position reader.

Figure 2A:
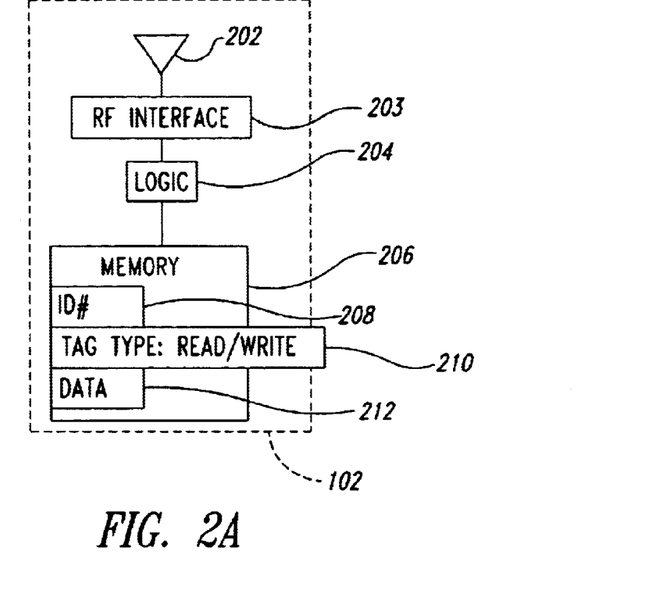
FIG. 2A is a block diagram of a data RFID tag from FIG. 1.

Referring to FIG. 2A, the data tag 102 includes an antenna 202, an RF section 203, a logic section 204 and a memory 206. The RF section 203 includes an RF receiver and an RF transmitter or antenna modulator both coupled to the antenna 202. The RF section 203 may include an antenna modulator or RF oscillator depending on the type of RF communications link. Alternatively, the RF receiver and the transmitter can employ separate antennas (not shown). Any of various known types of antennas may be employed, and preferably an antenna matched for the distance, directionality, interference and other requirements of use for the tag.

The logic section 204 includes analog circuits interfacing the RF receiver and transmitter to the digital circuit for reading and writing to the memory 206. The RF receiver portion of the RF section 203 converts an RF signal from the antenna 202 to a DC voltage, which powers up the tag. The digital circuit portion of the logic section 204 generally executes all of the functions of the data tag 102, such as retrieving stored data from the memory 206 and providing a modulating signal to the RF sections to transmit the retrieved data. While the data tag 102 shown is a passive device, a self-powered active device (powered by a battery) can be employed.

Importantly, the memory 206 of the data tag 102 includes at least three portions or fields: a tag ID number field 208, a tag type field 210 and a data field 212. The tag ID number field 204 provides a serial number or other identifying number for the data tag 102, which may be a unique number. The tag type field 210 indicates whether the tag is a control tag, as described below. Since the data tag only stores data that may be read and written to (rather than storing instructions), the tag type field stores an appropriate value to indicate this to the reader 100. The data field 212 includes data stored in the tag 102, such as date, time, and information regarding an object or objects to which the tag may be affixed.

Unless described otherwise below, the construction and operation of the various blocks shown in FIG. 2A and the other Figures are of conventional design. As a result, such blocks need not be described in great detail herein, as they will be understood by those skilled in the relevant art. Such description is omitted for purposes of brevity and so as not to obscure the detailed description of the invention. Any modifications necessary to the blocks of FIG. 2A or the other Figures can be readily made by one skilled in the relevant art based on the detailed description provided herein. The term "field" as used herein can be any select number of byte or bytes or other set of data at a predetermined location in the memory or in a serial string of data, with or without delimiters, headers/trailers or other overhead data to distinguish such bytes from adjacent data. Thus, a field may be recognizable by position, offset, delimiter field identifier or any other method of identifying the appropriate byte or bytes of data within the memory.

Figure 2B:
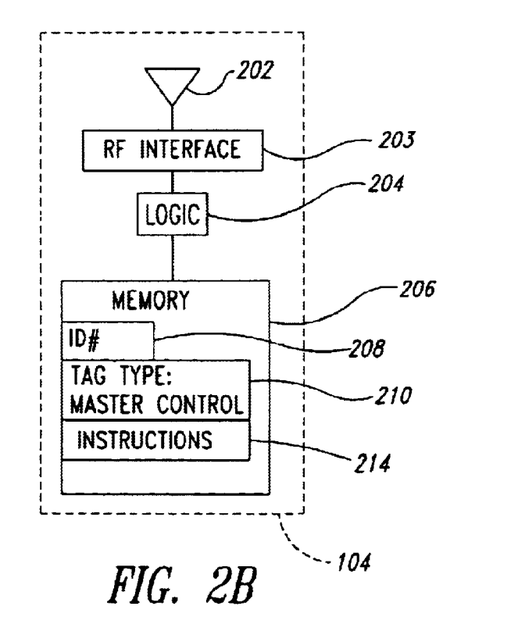
FIG. 2B is a block diagram of a control RFID tag from FIG. 1.

Referring to FIG. 2B, the master control tag 106 is shown. The master control tag 106 is substantially similar in construction and operation to the data tag 102. The tag type field 210, however, contains an indication that the master control tag 106 is indeed a master control tag. Additionally, the master control tag 106 includes an instructions field 214 that includes one or more instruction sets for uploading to the reader 100, as described below.

Figure 3:
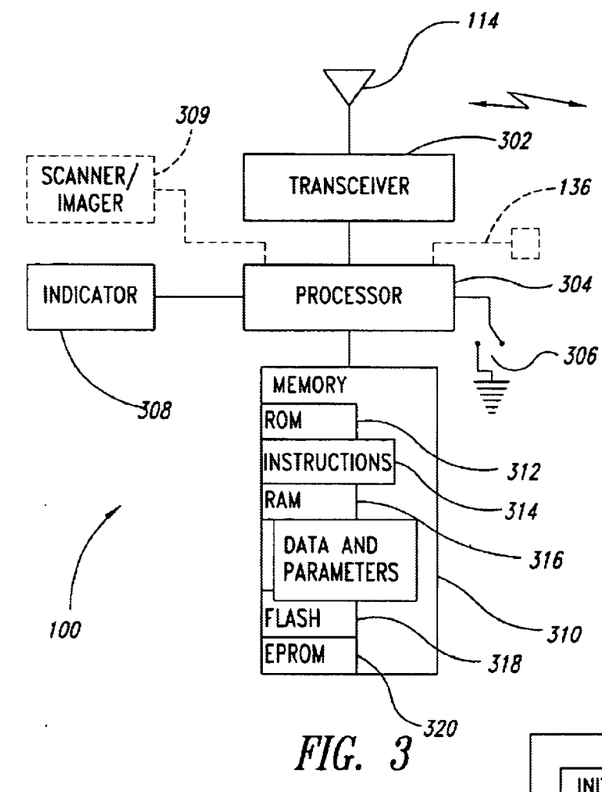
FIG. 3 is a block diagram of the RFID reader of FIG. 1.

Referring to FIG. 3, one embodiment of the reader 100 includes the antenna 114 and a transceiver 302 for communicating with the RFID tag 102. While discussed in terms of radio frequency, the reader 100 can operate in other portions of the electromagnetic spectrum, for example, microwave, optical or light, or infrared. A microprocessor or processor 304, coupled to the antenna 114 through the transceiver 302, controls the operation of the reader 100.

Importantly, the reader 100 of FIG. 3 includes minimal user input and output devices. For example, the reader 100 employs only a trigger switch 306 and an indicator 308, both coupled to the processor 304, for providing user input and output, respectively. The indicator 308 may be a buzzer, speaker or other simple audible output device, or one or more light-emitting elements (such as a multicolor LED that changes color based on received signals. Alternatively, the RFID reader 100 may employ a simple touch sensitive display. The reader 100 may also include an optional scanner or imager engine 309 to permit the reader to image and decode machine-readable symbols such as the bar code symbols 108 and 110. Other input devices can include a microphone for voice activation of the reader 100, or a distance or motion sensor to automatically enable reading/scanning of tags/symbols.

The reader 100 includes a memory 310 coupled to the processor 304. The term "processor" as generally used herein refers to any logic processing unit, such as one or more central processing units (CPUs), digital signal processors (DSPs), application-specific integrated circuits (ASIC), etc. While the RF section 203, logic section 204 and memory 206 (for the tags), and processor 304, memory 310 and other components (for the imager 100) are shown as separate blocks, some or all of these blocks can be monolithically integrated onto a single chip.

The memory 310 includes random access memory ("RAM") 316 and read-only memory ("ROM") 312 to provide storage for instructions, parameters and data for the processor 304. As explained below, the memory 310 includes an instructions memory 314 (RAM or ROM) to allow the processor 304 to be programmed to receive, write, and/or manipulate data in the data tag 102. Readers for acquiring data from machine-readable symbols, and for acquiring and writing data to RFID tags, are generally known in the relevant arts.

The ROM 312 is a non-volatile memory having sufficient space to store at least an operations kernel. As shown in FIG. 3, the memory 310 also includes flash memory 138 and electronically erasable programmable read-only memory (EEPROM) 320. The ROM 312 may take the form of an "EPROM," "EEPROM," or a flash memory to permit the kernel and other instructions to be upgraded. The kernel includes basic input-output instructions and a basic operating system that contains machine-level and system-level commands, functions typically hidden from the user, including device drivers, memory management routines, and system calls. The kernel may be a minimum set of system-level commands required to initiate, or "boot-up," and control the reader 100. The kernel allows the ROM 312 to be relatively small compared to the rest of the memory 310, and to facilitate instruction set changes and upgrades for the reader 100, as explained below. Alternatively, the reader 100 may, of course, include a more thorough and complete set of instructions.

Figure 4:
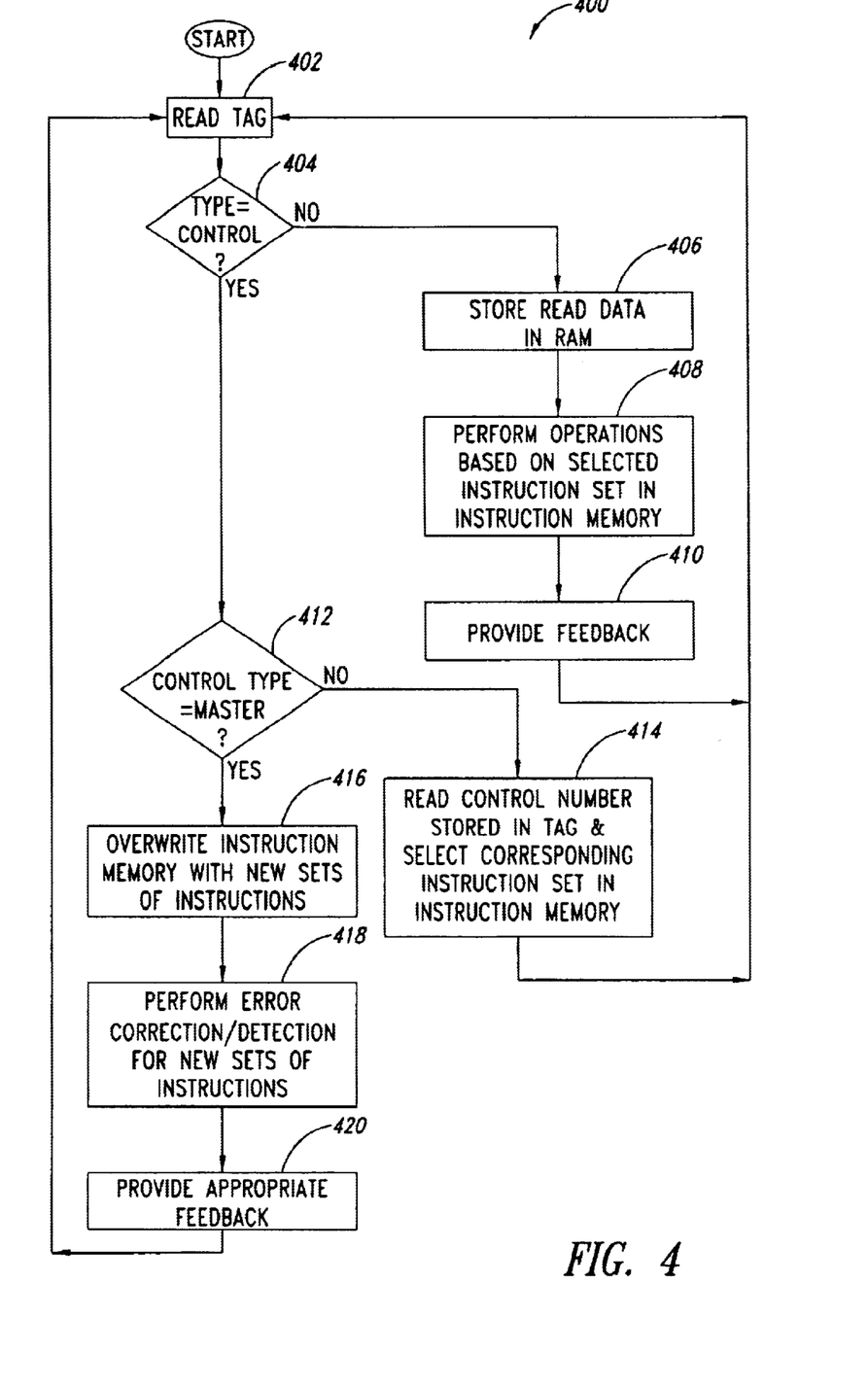
FIG. 4 is a flowchart showing the sequence of operations by the RFID reader of FIG. 3.

Referring to FIG. 4, a facility or routine 400 represents a portion of the minimum set of system-level commands stored in the ROM 312 for the reader 100. As explained below, the routine 400 permits the reader 100 to be readily field-programmable. Unless described otherwise herein, the steps described with respect to FIG. 4 and the other Figures and alternatives are well known, or those skilled in the relevant art can create source code (such as in Visual Basic), microcode or program logic arrays or firmware for such steps, based on the detailed description provided herein. All or part of the routine 400 can be stored not only in the memory 310, but also non-volatile memory and removable computer readable media noted above.

The routine 400 begins in step 402 where the reader 100 reads or interrogates a tag. Methods for reading tags are well-known, and often employ manufacturer specified protocols. Under step 402, the processor 304 reads at least portions of the memory 206 of the tag, including the tag type field 210.

In step 404, the processor 304 determines if the tag 104 is a control tag. Specifically, the processor 304 determines if the tag type field 210 indicates that the tag 102 is a control tag. If not, then the processor 304 stores data read from the data field 212 into the RAM 316 under step 406. In step 408, the processor 304 performs operations based on a selected instruction set in the instructions memory 314, as described below. In step 410, the processor 304 provides appropriate feedback to the user. For example, if the processor 304 properly performed the operations under step 408, then the processor provides a signal to the indicator 308, which in turn provides feedback to the user that the operations were correctly performed. Alternatively, if the operations were not correctly performed, or if the user must perform additional input, the processor 304 provides such an appropriate signal to the indicator 308.

If the processor 304 determines in step 404 that the tag read is a control tag, then in step 412, the processor determines whether the tag is a master control tag. Specifically, the processor 304 determines whether the tag type field indicates that the tag is a master control type tag. If not, then in step 414, the processor 304 reads a control number stored in the instruction field 214 and selects a corresponding instruction set in the instruction memory. Specifically, the instruction field 214 of the tag 106 includes a pointer or other indication that the processor 304 reads, and in response thereto, the processor selects one of several instruction sets stored in the instructions memory 314, as described more thoroughly below. In step 414, the processor 304 may instruct the indicator 308 to provide an appropriate feedback to the user. For example, the processor 304 may cause the indicator 308 to provide three flashes of an LED (or three audible bursts from a buzzer) to indicate that the third instruction set has been selected after reading the control tag 106.

After step 414, the routine 400 loops back to step 402 where the reader 100 reads another tag. If the next tag read by the reader 100 is not a control tag, such as the data tag 102, then the reader 100 performs, in step 408, the instruction set selected previously in step 414.

If the tag read is a master control tag (as defined by the tag type field 210), then in step 416 the processor 304 overwrites some or all of the instructions memory 314 with new sets of instructions read from the instruction field 214 of the master control tag 104. This permits the reader 100 to reprogram itself by simply reading the master control tag 104 and uploading new sets of instructions from the tag.

In step 418, the processor 304 performs an optional step of performing error correction or detection for the new sets of instructions read in step 416. For example, the processor 304 can perform a simple checksum for each instruction set to detect whether any errors occurred during reading/writing. Alternatively, instruction sets or other data read from the tag 104 (or other tags) may include error correction fields that permit the processor 304 to correct errors in instructions/data read from the tag In step 420, the processor 304 provides a signal to the indicator 308 to provide appropriate feedback to the user. If the new sets of instructions were correctly stored in the instructions memory 314, then the indicator 308 provides an affirmative feedback to the user. Alternatively, if some error occurred during transmissions with the tag 104 or writing to the instructions memory 314, then the processor 304 causes the indicator 308 to provide a negative feedback to the user. The routine 400 then loops back to step 402 where a new tag may be read, or the previous tag reread if the negative feedback was provided to the user.

In an alternative embodiments, the reader 100 is to only be preconfigured with a fixed group of instruction sets. This alternative embodiment, and those alternatives and alternative embodiments described herein, are substantially similar to previously described embodiments, and common steps and structures are identified by the same reference numbers. Only significant differences in operation or structure are described in detail.

Under this alternative embodiment, steps 412, 416, 418 and 420 are eliminated. As a result, the reader 100 only employs one of several instruction sets stored within the reader 100. To add or change instruction sets, the reader can be connected to the computer system 120 for such reprogramming, or have its ROM physically modified.

Figure 5:
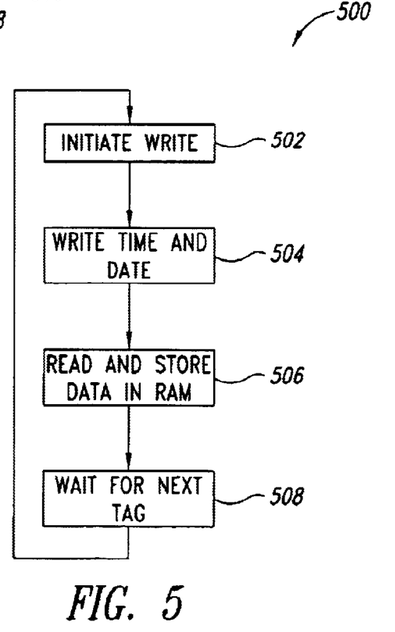
FIG. 5 is a flowchart diagram of an instruction set stored in a memory of the RFID reader of FIG. 3.

Referring to FIG. 5, an example of an instruction set that may be uploaded from the instructions field 214 of the master control tag 104, stored in the instructions memory 314 of the reader 100, and selected by the control tag 106, is shown as a routine 500. The routine 500 begins in step 502 where the processor 304 initiates a write operation with a tag, such as by waking up the tag and performing any necessary handshake protocols. In step 504, the processor 304 writes the current time and date to appropriate fields in the data section 212 of the tag 102. In step 506, the processor 304 reads data, such as product description data, in portions of the data field 212 of the tag 102 and writes such data to the RAM 316. In step 508, the processor 304 waits to read the next tag. For example, the processor 304 waits for actuation of the trigger switch 306 to initiate a write operation under step 502. Of course, the routine 500 is only one example of many instruction sets that may be stored in the instructions memory 314 and selected and performed by the reader 100.

Figure 6:
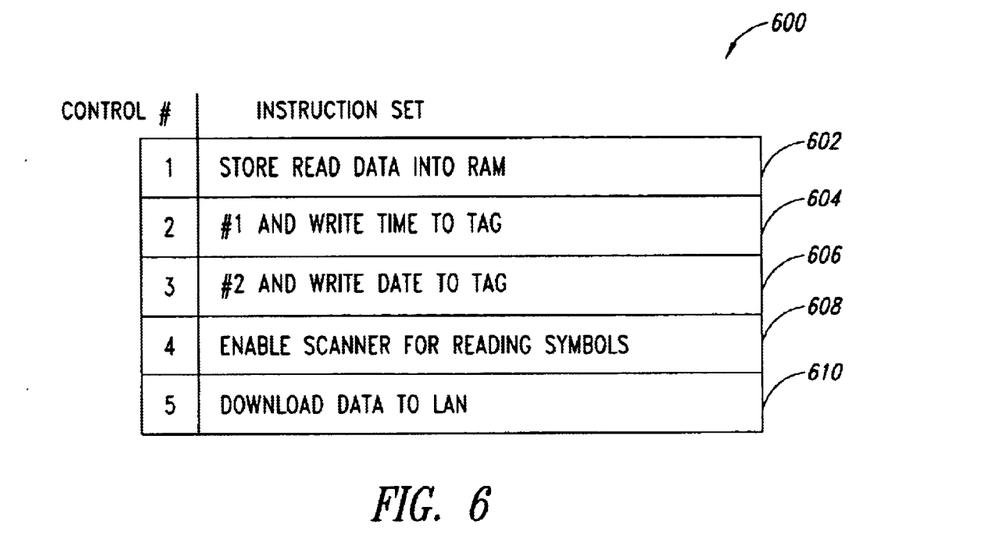
FIG. 6 is a data structure diagram showing sets of instructions for the RFID reader of FIG. 3.

Referring to FIG. 6, a data structure or table 600 representing sets of instructions stored in the instruction memory 314 of the reader 100 (and in the instructions field 214) is shown. The table 600 includes five sets of instructions 602–610, each having a corresponding control number 1–5. Each instruction set in the table 600 may include a header that precedes the control number, and a trailer that follows error correction/detection bytes, to indicate the beginning and end of each instruction set, and thereby facilitate transmission to, and reception by, the reader 100. Management or the manufacturer of the reader 100 may define the particular instruction sets to be employed by the reader 100.

The first instruction set 602 (associated with control number 1) provides instructions for the reader 100 to store data read from the data field 212 into the RAM 316. The second instruction set 604 (associated with control number 2) provides instructions for the reader 100 to perform all instructions associated with control number 1, as well as to write a current time to the tag 102.

The third instruction set 606 instructs the processor 304 to perform all of the operations under the second instruction set 604, as well as writing the current date to the tag 102. The third instruction set 606 is similar to the routine 500 described above. The fourth instruction set 608 (associated with control number 4) instructs the reader 100 to enable its scanner 309 to permit the reader to scan bar code symbols. The reader 100 may then scan bar code symbols, such as the symbols 108 and 110, and transmit such data to the computer system 120 for decoding. Alternatively, the fourth instruction set 608 can include one or more bar code symbology sets or alphabets and decoding instructions to permit the reader 100 itself to decode the bar code symbols 108 and 110 into corresponding characters (such as ASCII characters).

The fifth instruction set 610 (associated with control number 5) instructs the reader 100 to download data stored in the RAM 316 to the computer system 120. For example, the fifth instruction set 610 causes the processor 304 to enable the transceiver 302 to establish communications with the transceiver 118, and to read and upload data stored in the RAM 316 to the computer system 120.

Of course, many other alternative instruction sets may be employed. One instruction set can enable or change input and output devices with respect to the reader 100. For example, this alternative instruction set can instruct the processor 304 to detect a quick, double-actuation of the trigger switch 306 (a "double click"), which enables the scanner 309; a single click of the trigger switch initiates read/write of RFID tags. Alternatively, such an instruction set can provide different sound files where the indicator 308 is a speaker. For example, a new instructions set can provide Spanish language feedback messages such as "good read" and "read tag again," which overwrite previously stored audio feedback messages in the English language.

Another instruction set can enable the reader 100 to continuously store data read from various tags into the RAM 316. When the RAM reaches a certain capacity, the reader 800 automatically uploads read data to the computer system 120 when within range of the antenna 116. This instruction set would permit rapid data collection within a warehouse environment containing multiple tags.

Another instruction set can instruct the reader 100 to read date fields in various tags. When a date field is earlier than a threshold date, then data, including the tag ID number for that particular tag, is stored in the RAM 316. Such an instruction set can help identify stale items or old inventory within a warehouse. Likewise, another instruction set can search for a desired tag having a particular tag ID number or particular product description data in the fields 208 and 212, respectively. A user of the reader 100 may thus locate a particular item within a warehouse associated with the desired tag.

The instruction sets may represent any recent upgrades. This may prove particularly convenient where, for example, the reader manufacturer or vendor continually upgrade the reader 100 to include the most recent set of software, including any bug fixes or revisions, new tag protocols, alphabets for new machine readable symbologies, new reader functionality, etc.

The instruction sets may be formed as linked library modules to form an executable instruction set for the reader 100. Linking comprises producing an executable program from one or more modules, such as programs, routines or libraries. The library modules may be dynamically linkable libraries ("DLL"), to permit "on-the-fly" reconfiguration.

The above described embodiment provides a simple, inexpensive and fool-proof reader 100 with controllable functions, which is programmable using a simple interface, and which prevents undesired operation due to intentional or unintentional input or control by a user. The above embodiment provides desired capability for the reader 100 without using expensive keyboards or display screens in the reader.

In operation, a user of the reader 100 may be instructed by management to interrogate all tags in a warehouse using instruction set number 3. The user of the reader 100 locates the appropriate control tag, such as the tag 106, by reading the human-readable indicia 112. Human-readable indicia associated with control tags can include appropriate commands corresponding to the instruction sets, such as "take inventory" (for a first instruction set 602), and "take inventory, and write current time and date to tag" (for the third instruction set 606). If the control tag 106 is positioned with several other tags, such as with tags 102 and 104, several methods may be employed to isolate one tag. For example, the user of the reader 100 can scan the symbol 110, which includes the tag ID number for the desired tag (e.g. control tag 106). The processor 304 then interrogates or reads only the control tag 106 (associated with the appropriate tag ID number scanned from the symbol 110). In sum, the symbol 110 forms a key to accessing the tag 106 in a field of numerous other tags. Alternatively, physical controls can be employed such as keeping all control tags in an electromagnetically shielded enclosure and bringing only one tag out to be read by the reader 100. However, physical control of all tags can be cumbersome and can be prone to error.

The reader 100 recognizes that the tag 106 is a control tag in step 404, and thus selects the third instruction set 606 in step 408, using an appropriate software switch or pointer to the third instruction set of the table 600 stored in the instructions memory 314. The processor 304 causes the indicator 308 to blink three times to indicate to the user that the third instruction set has been correctly selected. The user then reads all tags within the warehouse, and with each read, stores data read from the tag in the RAM 316 to later download for inventory purposes, and writes the current time and date to the tag, under the third instruction set 606. After reading all tags within the warehouse, the user uploads the data to the computer system 120 by either selecting the fifth instruction set 610, or coupling the reader 100 via the socket 136 and plug 138. Alternatively, if the reader 100 includes a wireless link to the computer network 120, the reader can automatically upload read data to the computer system in real time each time a tag is read (based on another instruction set stored in the memory 310).

Importantly, many operations can be controlled by using appropriate control tags 104 and 106. The reader 100 need not be connected to a remote device, or include a keyboard or display, to allow reader customization. Thus, the reader can be simple, inexpensive and tamper-proof. The user cannot intentionally or unintentionally cause the reader to perform actions undesired by management. The control tags 104 and 106, by selecting desired instruction sets, reduce or eliminate human error typical with manual data entry or control. While the reader 100 is described above as only selecting one of five instruction sets under the control tag 106, the reader can select more than one instruction set. For example, the reader 100 can select both the third and fourth instruction sets 606 and 608 to permit the reader to also scan bar code symbols within the warehouse.

In one alternative embodiment, the control tag 104 is eliminated. Instead, the bar code symbol 108 simply provides the appropriate control number or pointer to instruct the reader 100 as to which of several stored instruction sets is to be employed. Thus, in this alternative embodiment, a user need only cause the reader 100 to read the symbol 108 in order to enable the desired instruction set in the instructions memory 314.

Figure 7:
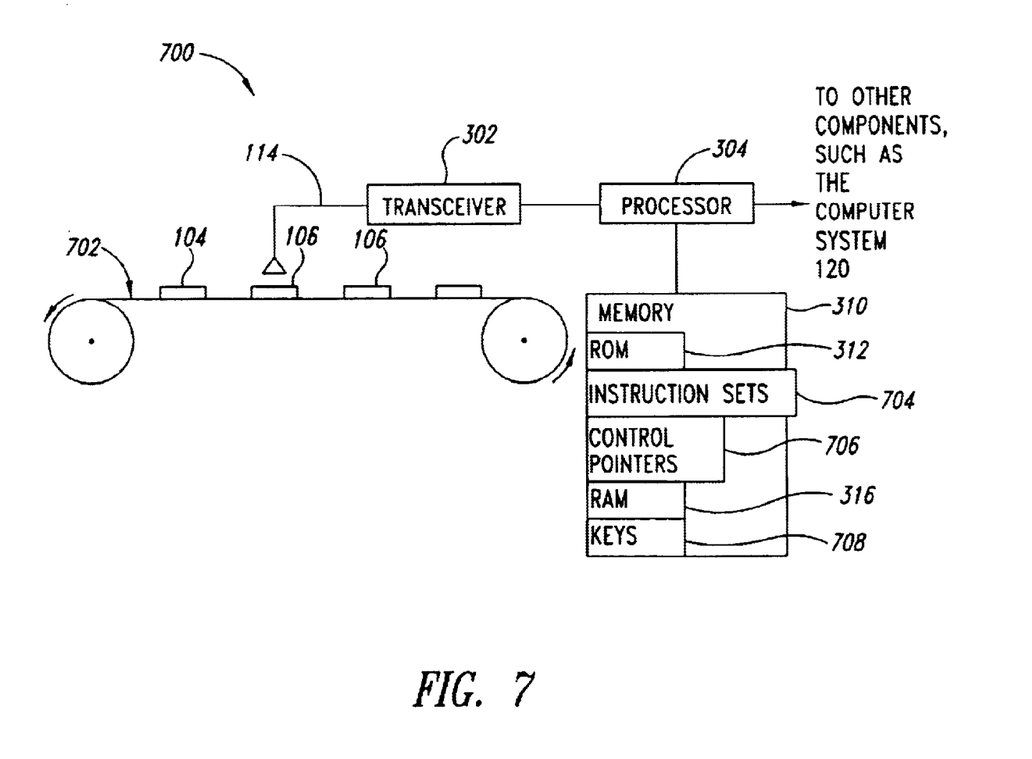
FIG. 7 is a block diagram of a RFID programmer/tester for RFID tags.

Referring to FIG. 7, an alternative embodiment employs a tag programmer and/or tester system 700 for programming RFID tags, which is similar to the reader 100. A conveyor system 702 transports one or more tags, such as the tags 104 and 106, past the antenna 114. The antenna 114 preferably is configured to read and write to only one tag positioned near by, or employ other isolating structures so that only one tag may be operated on at a time. The processor 304 controls data and instructions read from and written to the tags 104 and 106. The processor 304 is coupled to the memory 310, which includes an instruction set section 704 and a control pointers section 706. The instruction sets section 704 include many or all instruction sets that may be written to the master control tags 104. Likewise, the control pointers section 706 of the memory 310 include pointers for all instruction sets. A programmer can select appropriate instruction sets from the instruction set section 704 to be written to the master control tags 104. Additionally, the programmer can select one or more control pointers from the control pointer section 706 to be written to the control tags 106.

The tag programmer system 700 can include appropriate security safeguards to ensure that unauthorized programmers or personnel do not create or alter the master control tags 104 and control tags 106. Additionally, the control tags 106 and master control tags 104 may include a security field that prohibits data to be written thereto without an appropriate key. The processor 304 accesses one or more keys stored in a key section 708 of the memory 310 to permit data to be written to the master control tags 104 and control tags 106.

In another alternative embodiment, the reader 100 itself is configured or modified to write instruction sets to the master control tag 104 and control pointers to the control tag 106. In this alternative embodiment, the reader 100 is configured to upgrade or update the master control tag 104 with new instructions sets, and corresponding new control pointers to the control tag 106. Again, the reader 100 in this alternative embodiment may have stored in its memory 310 keys to permit only authorized writing to the tags 104 and 106. The reader 100 may receive and download for storage into its memory 310 updated instruction sets and control pointers from the computer system 120. Such a modified reader 100 can include additional input switches or keys to select appropriate selection sets to be downloaded into master control tags.

In another alternative embodiment, the reader 100 employs only a basic communications kernel that permits it to communicate with the computer system 120, including the server 122. When communicating therewith, the server 122 determines the operational characteristics of the reader 100, such as by examining hardware characteristics of the reader itself, without user involvement. For example, each hardware component in the reader 100 is assigned a hardware type identifier that is made available on the server 120, identifying, for example, the type of hardware, the manufacturer and the model of the hardware component. The server 122 may determine many operational characteristics using this information to access a lookup table. The server 120 may alternatively, or additionally, examine the boot history or download history of the reader 100, determining which hardware components of the reader were successfully enabled. Further details on downloading instruction sets, parameters and commands to the reader 100 from the computer system 120 can be found in U.S. patent application Ser. No. 09/237,625, entitled "Apparatus and Method to Configuring a Device, Such as a Printer Over a Network," filed Jan. 26, 1999, and assigned to the assignee of the present invention.

In another alternative embodiment, the reader 100 (or programming system 700) include one or more replaceable hardware modules that may be readily field-replaced by an inexperienced user. The master control tag 104 may then include instruction sets for enabling the new module, including appropriate device drivers, and the like. For example, the scanner/imager engine 309 may be formed as a module and plugged into the reader 100, and then appropriate instruction sets for scanning bar code symbols uploaded to the instructions memory 314 via the master control tag 104. Thus, modularity in hardware design would provide significant benefits in conjunction with modular software design. For example, this might permit a number of vendors to supply a variety of hardware components that could be easily swapped into and out of the reader 100, including print-engines, global positioning systems (GPS), etc.

The teachings of U.S. patent application U.S. Ser. No: 09/240,108, filed Jan. 29, 1999, entitled "REMOTE ANOMALY DIAGNOSIS AND RECONFIGURATION OF AN AUTOMATIC DATA COLLECTION DEVICE PLATFORM OVER A TELECOMMUNICATIONS NETWORK"; and provisional application U.S. Ser. No. 60/084,272, filed May 4, 1998, entitled "AUTOMATIC DATA COLLECTION DEVICE HAVING A NETWORK COMMUNICATIONS CAPABILITY", and other U.S. patents and applications cited above are incorporated herein by reference.

Although specific embodiments of, and examples for, the invention are described herein for illustrative purposes, various equivalent modifications can be made that are within the spirit and scope of the invention, as will be recognized by those skilled in the relevant art. The teachings provided herein of the invention can be applied to any processor controlled device, not necessarily the reader generally described above. For example, the above described embodiments may be modified to incorporate the teachings of the U.S. patents and applications cited above to produce even further embodiments within the scope of the invention.

Similarly, the teachings may be applied to other devices not traditionally associated with readers, such as a computer, a television, a VCR, a washing machine or dryer, and other home and commercial appliances and equipment. Thus, for example, a VCR may be upgradable to record in a format other than VHS (e.g. employ compression/decompression routines) or to reconfigure a control panel or GUI for programming the VCR. The VCR (or other devices) include a low cost RFID Reader Engine to permit the VCR to read control tags and master control tags. The VCR may thereby be kept up-to-date with changing standards. Thus, the method and apparatus described above permit traditionally dedicated or "embedded" devices to be actively reconfigured and/or upgraded according the desires of the user. The method and apparatus further permit a device to function using a limited amount of ROM. Further, the method and apparatus automatically provide the device with the most recent software that is compatible with the various hardware components, user selected options and hardware and ownership information. Additionally, the method and apparatus permit a technician to download diagnostic programs to the device and to troubleshoot and repair the device from a remote location. Thus a modularized, easily and automatically upgradable and repairable device may be provided under the teachings of the invention.

These and other changes can be made to the invention in light of the above detailed description. In general, in the following claims, the terms used should not be construed to limit the invention to the specific embodiments disclosed in the specification and the claims, but should be construed to include all microprocessor controlled devices that operate in accordance with the claims. Accordingly, the invention is not limited by the disclosure, but instead its scope is to be determined entirely by the following claims.

I claim:

1. A radio frequency identification (RFID) reader apparatus for reading RFID tags, comprising:
   a radio frequency (RF) transceiver unit;
   a memory storing basic instructions for operating the reader and having an instructions memory section having a plurality of instructions sets stored therein; and
   a processor coupled to the memory and the RF transceiver unit, wherein the processor is programmed to wirelessly read data from a control RFID tag, via the RF transceiver unit, and select at least one of the plurality of instructions sets in the instructions memory section based on the read data, and wherein the processor thereafter performs the instructions in the selected instructions set.

2. The apparatus of claim 1, further comprising a hand held housing that encloses the RF transceiver unit, the memory and the processor, wherein the processor is programmed to read a type field in a memory of each RFID tag, and wherein the processor is further programmed to read the type field of a master control RFID tag and read a new plurality of instructions sets from the memory of the master control tag and write the new plurality of instructions sets into the instructions memory section, and wherein the processor performs error detection or correction after reading at least a portion of the new plurality of instructions sets.

3. The apparatus of claim 1, further comprising no more than three user actuatable switches and no more than three light-emitting elements, wherein at least one of the three switches is a trigger switch, and wherein at least one of the light-emitting elements provides user feedback indicating that the selected instructions set was selected from the plurality of instructions sets.

4. The apparatus of claim 1, further comprising a machine-readable symbol reader, speaker and microphone coupled to the processor, and wherein the memory includes commands for causing the processor to provide audible user feedback signals to the speaker, and to receive audible user command signals from the microphone.

5. The apparatus of claim 1, further comprising a port coupled to the processor that permits the processor to be selectively coupled to a computer network for exchanging information therewith, and wherein the processor receives, and stores in the instructions memory section, new instructions sets from the computer network.

6. The apparatus of claim 1, further comprising:
   a keyboard coupled to the processor;
   a touch-sensitive screen coupled to the processor; and
   a card slot having a port to couple a semiconductor chip athe card to the processor.

7. An apparatus, comprising:
   a data carrier receiver unit that at least receives data stored by data carriers;
   a memory storing basic instructions for operating the apparatus and having an instructions memory section having a plurality of instructions sets stored therein; and
   a processor coupled to the memory and the data carrier receiver unit, wherein the processor is programmed to read data from a control data carrier and select at least one of the plurality of instructions sets in the instructions memory section based on the read data, and wherein the processor thereafter performs the instructions in the selected instructions set.

8. The apparatus of claim 7, further comprising a hand held housing that encloses the data collection receiver unit, the memory and the processor, wherein the data carrier receiver unit is a radio frequency identification (RFID) transceiver, wherein the data carrier is an RFID tag, wherein the processor is programmed to read a type field in a memory of the RFID tag, and wherein the processor is further programmed to read the type field of a master control RFID tag and read a new plurality of instructions sets from the memory of the master control tag and write the new plurality of instructions sets into the instructions memory section, and wherein the processor performs error detection or correction after reading at least a portion of the new plurality of instructions sets.

9. The apparatus of claim 7, further comprising no more than five user actuatable switches and at least one light-emitting element, wherein at least one of the five switches is a trigger switch, and wherein the light-emitting element provides user feedback indicating that the selected instructions set was selected from the plurality of instructions sets.

10. The apparatus of claim 7, further comprising a machine-readable symbol reader, and speaker, wherein the memory includes spoken language commands for causing the processor to provide audible spoken language user feedback signals to the speaker.

11. The apparatus of claim 7, further comprising a wired or wireless connection, coupled to the processor, that permits the processor to be selectively coupled to a computer network for exchanging information therewith.

12. The apparatus of claim 7 wherein the data carrier receiver unit includes a machine-readable symbol reader, and wherein the control data carrier is a machine-readable symbol.

13. The apparatus of claim 7, further comprising no more than five user actuatable switches and at least one light-emitting element, wherein at least one of the five switches is a trigger switch, and wherein the light-emitting element provides user feedback indicating that the selected instructions set was selected from the plurality of instructions sets.

14. The apparatus of claim 7, further comprising a speaker coupled to the processor, wherein the processor receives, from a master control data carrier, spoken language commands for causing the processor to provide audible spoken language user feedback signals to the speaker, and wherein the processor stores the language commands in the memory.

15. The apparatus of claim 7 wherein the processor receives, from a computer network, new instructions sets and stores the new instruction sets in the instructions memory section.

16. The apparatus of claim 7, further comprising a hand held housing that encloses the data collection receiver unit, the memory and the processor, wherein the data carrier receiver unit is a radio frequency identification (RFID) transceiver, wherein the data carrier is an RFID tag, and wherein the processor is programmed to write new plurality of instructions sets to a master control RFID tag.

17. The apparatus of claim 7 wherein the memory has stored therein a communications kernel, wherein the processor communicate with a computer network based on the communications kernel, and wherein the processor receives, from the computer network, instructions sets and stores the instruction sets in the instructions memory section.

18. The apparatus of claim 7, further comprising:
a keyboard coupled to the processor; and
a display screen coupled to the processor.

19. The apparatus of claim 7, further comprising a machine-readable symbol reader coupled to the processor, wherein the machine-readable symbol reader reads a machine-readable symbol for the control data carrier, wherein the machine-readable symbol provides data to the processor to identify and select the control data carrier using the data carrier receiver unit.

20. An apparatus, comprising:
a radio frequency identification (RFID) transmit unit and antenna that transmits data to RFID tags for writing said data to the RFID tags;
a memory; and
a processor coupled to the memory and the RFID unit, wherein the processor is programmed to wirelessly write a command to a specified field of at least one RFID tag, wherein the command causes an RFID reader, which wirelessly reads the at least one RFID tag, to select at least one of a plurality of instructions sets stored in the RFID reader, and wherein the RFID reader thereafter executes the selected instructions set after reading the command.

21. The apparatus of claim 20 wherein the RFID transmit unit is an RFID transceiver, wherein the memory has an instructions memory section storing a plurality of instructions sets therein, and wherein the processor is programmed to write at least some of the plurality of instruction sets in master control RFID tags.

22. The apparatus of claim 20, further comprising a connection element, coupled to the processor, that permits the processor to be coupled to a computer network for exchanging information therewith.

23. The apparatus of claim 20 wherein the processor receives, from a computer network, new instructions sets and stores the new instruction sets in the memory.

24. The apparatus of claim 20 wherein the memory has stored therein at least one key, and wherein the processor accesses the key to obtain prior authorization before writing data to the at least one RFID tag.

25. An apparatus, comprising:
a communication terminal configured to establish an communications channel with a radio frequency identification (RFID) reader;
a memory; and
a processor coupled to the memory and the communication terminal, wherein the processor is programmed to write at least one instructions set to an RFID reader, wherein the RFID reader thereafter reads a command data carrier to select and execute the at least one instruction set.

26. The apparatus of claim 25 wherein the communication terminal includes a socket that couples to a complimentary socket on the RFID reader wherein the memory has stored therein a plurality of instructions sets each identified by a corresponding code, and wherein the processor is programmed to write the plurality of instruction sets to the RFID reader when the communications channel is established.

27. The apparatus of claim 25, further comprising a wireless connection element, coupled to the processor, that permits the processor to be coupled to a computer network for exchanging information therewith.

28. The apparatus of claim 25 wherein the processor receives, from a computer network, new instructions sets and stores the new instruction sets in the memory.

29. The apparatus of claim 25 wherein the memory has stored therein at least one key, and wherein the processor accesses the key to obtain authorization before writing data to the RFID reader.

30. A data carrier tag, comprising:
an antenna;
a radio frequency (RF) circuit coupled to the antenna and having transmit and receive sections configured to enable the tag to respectively transmit and receive data;
a logic circuit coupled to the RF circuit; and
a memory coupled to the logic circuit and having stored therein a command in a specified field, wherein the command causes a radio frequency identification (RFID) reader, which reads the specified field, to select at least one of a plurality of instructions sets stored in the RFID reader, and wherein the RFID reader thereafter executes the selected instructions set after reading the command.

31. The tag of claim 30 wherein the memory includes a type field indicating that the tag is a master control RFID tag, and wherein the memory includes at least one new instructions set, wherein the logic circuit is configured to transmit the new instructions set to the RFID reader, and wherein the memory includes error detection or correction data associated with the new instructions set.

32. The tag of claim 30, further comprising a machine-readable symbol secured to the tag.

33. The tag of claim 30 wherein the memory stores spoken language user feedback sound files, and wherein the logic circuit is configured to transmit the sound files to the RFID reader.

34. The tag of claim 30 wherein the logic circuit is configured to receive at least one new command from an RFID read/write apparatus and to write the new command to the memory, and wherein the RFID reader thereafter reads the new command.

35. An automatically-readable medium to be automatically read by a microprocessor controlled device, the medium storing a data structure, comprising:
a type field;
at least one instructions set indicator field; and
for each instructions set indicator field, an instructions set, wherein each instructions set provides a plurality of instructions for controlling operations of a radio frequency identification (RFID) reader device.

36. The medium of claim 35, further comprising an identification field, and wherein one of the instructions sets includes instructions to control the RFID reader to write a current time and date to RFID tags.

37. The medium of claim 35 wherein one of the instructions sets includes instructions to control the RFID reader to read machine-readable symbols.

38. The medium of claim 35 wherein one of the instructions sets includes instructions to control the RFID reader to enable and employ a module added to the RFID reader to increase functionality of the RFID reader.

39. The medium of claim 35 wherein one of the instructions sets includes instructions to alter at least one function of at least one input switch of the RFID reader.

40. A method of controlling a radio frequency identification (RFID) reader, comprising:

reading a type field of a control RFID tag;

reading an instruction set identifier in the control tag; and selecting one of a plurality of instructions sets stored in the RFID reader based on the instructions set identifier.

41. The method of claim 40, further comprising:

determining that the control RFID tag is a master control RFID tag based on the reading of the type field; and receiving at least one new instructions set for storage in the RFID reader from the master control RFID tag.

42. An automatically-readable medium to be automatically read by a microprocessor controlled device, the medium storing instructions to be performed by the device, comprising:

reading a type field of a control radio frequency identification (RFID) tag;

reading an instructions set identifier in the control tag; and selecting one of a plurality of instructions sets stored in the RFID reader based on the instructions set identifier.

43. The medium of claim 42, further comprising:

determining that the control RFID tag is a master control RFID tag based on the reading of the type field; and receiving at least one new instructions set for storage in the RFID reader from the master control RFID tag.

44. A method of reading radio frequency identification (RFID) tags using an RFID reader, comprising:

reading an instructions set identifier in a control tag;

selecting one of a plurality of instructions sets stored in the RFID reader based on the instructions set identifier; and reading a plurality of RFID tags and executing the selected one instruction set until another instruction set identifier in another control tag is read.

45. The method of claim 44, further comprising:

reading a machine-readable symbol that provides an identifier for the control tag, before reading the instructions set identifier in the control tag;

determining that the control tag is a master control RFID tag; and receiving at least one new instructions set for storage in the RFID reader from the master control RFID tag.

46. The method of claim 44, further comprising:

reading a machine-readable symbol that provides an identifier for the control tag, and wherein receiving an instruction set includes reading the control tag based on the identifier, wherein the control tag is positioned near a plurality of other tags.

* * * * *